United States Patent
Wengrovitz (10) Patent No.: US 7,035,248 B2
(45) Date of Patent: Apr. 25, 2006

(54) SWITCH WITH EMULATION CLIENT

(75) Inventor: Michael Wengrovitz, Concord, MA (US)

(73) Assignee: Alcatel, Paris (FR)

( * ) Notice: Subject to any disclaimer, the term of this patent is extended or adjusted under 35 U.S.C. 154(b) by 793 days.

(21) Appl. No.: 09/781,851

(22) Filed: Feb. 12, 2001

(65) Prior Publication Data
US 2002/0110113 A1    Aug. 15, 2002

Related U.S. Application Data

(60) Provisional application No. 60/224,566, filed on Aug. 10, 2000.

(51) Int. Cl.
*H04L 12/66* (2006.01)
(52) U.S. Cl. ............... 370/352; 370/353; 370/466
(58) Field of Classification Search ........... 370/325, 370/351–356, 360, 465–467
See application file for complete search history.

(56) References Cited

U.S. PATENT DOCUMENTS

| | | | | |
|---|---|---|---|---|
| 6,032,043 A | * | 2/2000 | Houde | 455/433 |
| 6,453,034 B1 | * | 9/2002 | Donovan et al. | 379/220.01 |
| 6,477,150 B1 | * | 11/2002 | Maggenti et al. | 370/312 |
| 6,584,093 B1 | * | 6/2003 | Salama et al. | 370/351 |
| 6,636,596 B1 | * | 10/2003 | Gallant et al. | 379/220.01 |
| 6,678,246 B1 | * | 1/2004 | Smyth | 370/230 |
| 6,738,390 B1 | * | 5/2004 | Xu et al. | 370/467 |
| 6,775,269 B1 | * | 8/2004 | Kaczmarczyk et al. | 370/352 |

OTHER PUBLICATIONS

Alcatel OmniPCX 4400, Specifications; Jan. 15, 2001; 12 pp.
Alcatel OmniPCX 4400, Jan. 15, 2001; 20 pp.
Alcatel 4980 PC Telephony/Alcatel 4980 IP Telephony; Quick User Guide; 2 pp.
Internet papers: Alcatel pushes VoIP into branch office with new IP features for OmniPCX 4400; Feb. 6, 2001; 2 pp.
Internet Papers: Kent, S.; Atkinson, R.; "Security Architecture for the Internet Protocol"; Nov. 1998; Network Working Group Request for Comments 2401; 57 pp.
Internet Papers: Palme, J.; "Common Internet Message Headers"; Network Working Group Request for Comments 2076; Feb. 1997; 24 pp.
Internet Papers: Schulzrinne, H.; Casner, S.; Frederick, R.; Jacobson, V.; "RTP: A Transport Protocol for Real-Time Applications"; Network Working Group Request for Comments 1889; Jan. 1996; 65 pp.

(Continued)

*Primary Examiner*—Ajit Patel
*Assistant Examiner*—Chirag Shah
(74) *Attorney, Agent, or Firm*—Craig A. Hoersten; V. Lawrence Sewell (57) ABSTRACT

A switch with emulation client in a data communication network adhering to a Session Initiation Protocol (SIP). The switch is coupled to a legacy telephone which initiates or receives telephonic communication with a SIP-observant telephone or another legacy telephone over the SIP-observant network. The emulation client translates between PBX and SIP messages to allow the legacy telephone to communicate seamlessly over the SIP observant network. The switch is further coupled to a location server which storing redirection information for redirecting calls made to a particular number. The calls are preferably redirected based on the location where the user is scheduled to be at the time of the call.

10 Claims, 9 Drawing Sheets

OTHER PUBLICATIONS

Internet Papers: Schulzrinne, H.; Rao, A.; Lanphier, R.; "Real Time Streaming Protocol (RTSP)"; Network Working Group Request for Comments 2326; Apr. 1998; 80 pp.

Internet Papers: Williamson, S.; Kosters, M.; Blacka, D.; Singh, J.; Zeilstra, K,; "Referral Whois (RWhois) Protocol V1.5"; Network Working Group Request for Comments 2167; Jun. 1997; 60 pp.

Internet Papers: Yergeau, F.; "UTF-8, a transformation format of ISO 10646"; Network Working Group Request for Comments 2279; Jan. 1998; 9 pp.

Internet Papers: "Visual Telephone Systems and Equipment for Local Area Networks Which Provide a Non-guaranteed Quality of Service"; Series H—Audiovisual and Multimedia Systems; Infrastructure of audiovisual services—Systems and terminal equipment for audiovisual services; ITU-T; H.323; International Telecommunication Union; Nov. 1996 81 pp.

Internet Papers: Alvestrand, H.; "IETF Policy on Character Sets and Languages"; Network Working Group Request for Comments 2277 Jan. 1998; 8 pp.

Internet Papers: Atkins, D; Stallings, W.; Zimmerman, P.; "PGP Message Exchange Formats"; Network Working Group Request for Comments 1991; Aug. 1996; 19 pp.

Internet Papers: Braden, R.; Zhang, L.; Berson, S.; Herzog, S.; Jamin, S.; "Resource ReSerVation Protocol (RSVP)—Version 1 Functional Specification"; Network Working Group Request for Comments 2205; Sep. 1997; 97 pp.

Internet Papers: Bradner, S.; "Key words for use in RFCs to Indicate Requirement Levels"; Network Working Group Request for Comments 2119; Mar. 1997; 3 pp.

Internet Papers: Gulbrandsen, A., Vixie, P.; "A DNS RR for specifying the location of services (DNS SRV)"; Network Working Group Request for Comments 2052; Oct. 1996; 9 pp.

Internet Papers: Hamilton, M.; Wright, R.; "Use of DNS Aliases for Network Services"; Network Working Group Request for Comments 2219 ; Oct. 1997; 7 pp.

Internet Papers: Handley, M.; Jacobson, V.; "SDP: Session Description Protocol"; Network Working Group Request for Comments 2327; Apr. 1998; 37 pp.

Internet Papers: Handley, M.; Schulzrinne, H.; Schooler, E.; Rosenberg, J.; "SIP: Session Initiation Protocol"; Network Working Group Request for Comments 2543.

Johnston, Alan; Donovan, Steve; Sparks, Robert; Cunningham, Chris; Summers, Kevin, "SIP Telephony Call Flow Examples," Internet Draft, Oct. 1999, pp. 1-115, Retrieved from the Internet: URL:http://www.softarmor.com/wgdb/docs/draft-johnston-sip-call-flows-00.txt, Retrieved on Jan. 5, 2004.

Rosenberg, Jonathan and Schulzrinne, Henning, "SIP For Presence," IETF, Mar. 4, 1998, pp. 1-12, Retrieved from the Internet: URL:http://www.jdrosen.net/papers/ietf_sip_pipr_mar98.pdf, Retrieved on Jan. 5, 2004.

Camarillo, Gonzalo, "Best Current Practice for ISUP to SIP Mapping," Internet Draft, Aug. 1999, pp. 1-12, Retrieved from the Internet: URL:http://www.softarmor.com/wgdb/docs/draft-camarillo-mmusic-sip-isup-bcp-00.txt, Retrieved on Jan. 5, 2004.

Vaha-Sipila, A., Internet Engineering Task Force Network Working Group, Request for Comments: 2806, Apr. 2000, "URLs for Telephone Calls," Nokia Research Center, pp. 1-34.

* cited by examiner

SWITCH WITH EMULATION CLIENT

CROSS-REFERENCE TO RELATED APPLICATION(S)

This application claims the benefit of U.S. provisional application 60/224,566, filed Aug. 10, 2000, the content of which is incorporated herein by reference.

FIELD OF THE INVENTION

This invention relates generally to signaling protocols for Internet telephony, and more particularly, to switches providing emulation services for seamless communication of Internet calls utilizing different signaling protocols.

BACKGROUND OF INVENTION

Session Initiation Protocol (SIP) is a signaling protocol for creating, modifying, and terminating multimedia sessions, including Internet telephone calls, with one or more participants. Details about the SIP signaling protocol is set forth in Internet Engineering Task Force Request for Comment 2543 entitled "SIP: Session Initiation Protocol," March 1999 (hereinafter referred to as RFC 2543), which is incorporated herein by reference. SIP provides an alternative to PBX- or H.323-signaled telephony.

Callers and callees participating in a SIP signaled communication are identified by SIP URLs. When making a SIP call, a caller first locates an appropriate SIP server and sends a SIP request to the server via an IP network. The SIP server may be a proxy SIP server or a redirect SIP server. A common SIP request is an invitation where the caller asks the callee to participate in a session.

Figure 1A:
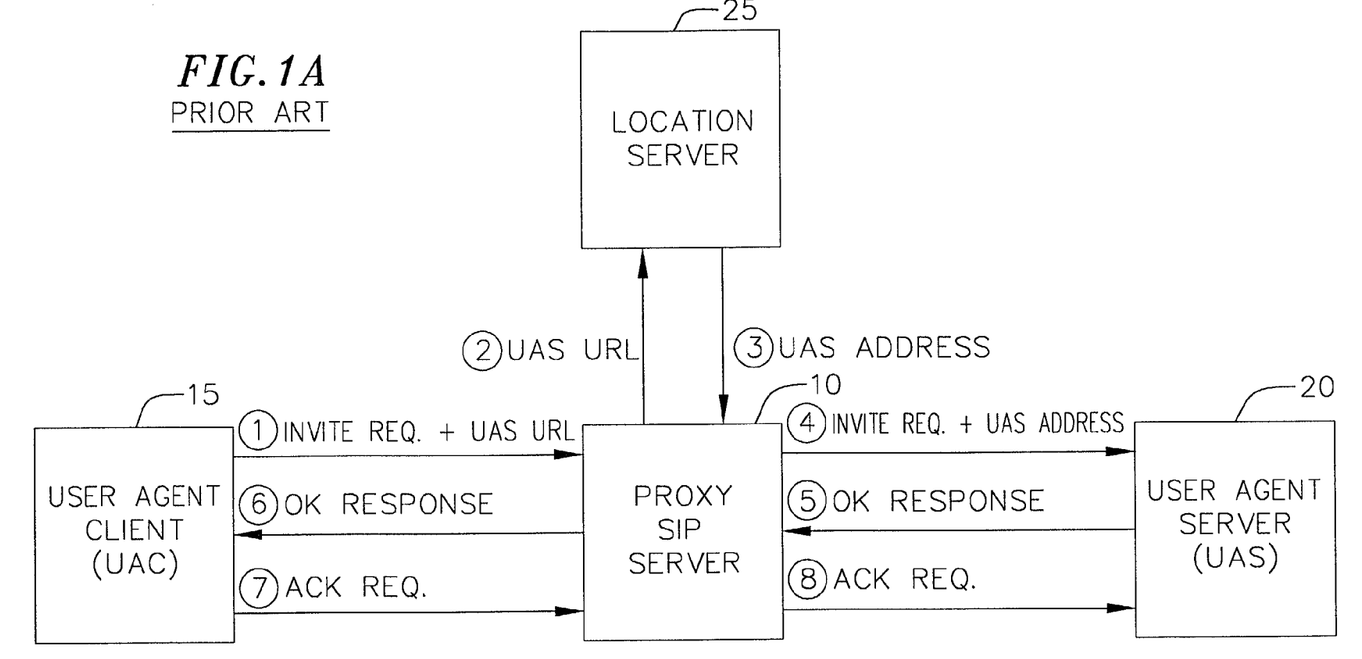
FIG. 1A is a functional block diagram of establishing a SIP call using a proxy SIP server.

FIG. 1A is a functional block diagram for establishing a SIP call via a proxy SIP server 10. The proxy server 10 receives an invitation from a calling device, referred to as a user agent client (UAC) 15, in the form of an INVITE request. The INVITE request includes the SIP URL of a user agent server (UAS) 20 that contacts the callee when a SIP request is received, and returns a response on behalf of the callee.

The proxy server 10 accepts the INVITE request and preferably engages a location server 25 to resolve the UAS URL to a more precise UAS address. For example, a call directed to a generic SIP URL such as, for example, "sales@acme.com" may be resolved to a particular person, such as, for example, "bob@ny.acme.com."

The proxy server 10 issues a second INVITE request to the more precise UAS address. The UAS 20 receives the second INVITE request and alerts the user of the request by, for example, causing the user's telephone to ring. If the call is answered, the UAS 20 returns a success indication to the proxy server 10 via an OK response. The proxy server 10 in turn forwards the OK response to the UAC 15. The receipt of the success result is confirmed by the UAC 15 by transmitting an ACK request to the proxy server 10, which then forwards it to the UAS 20.

Figure 1B:
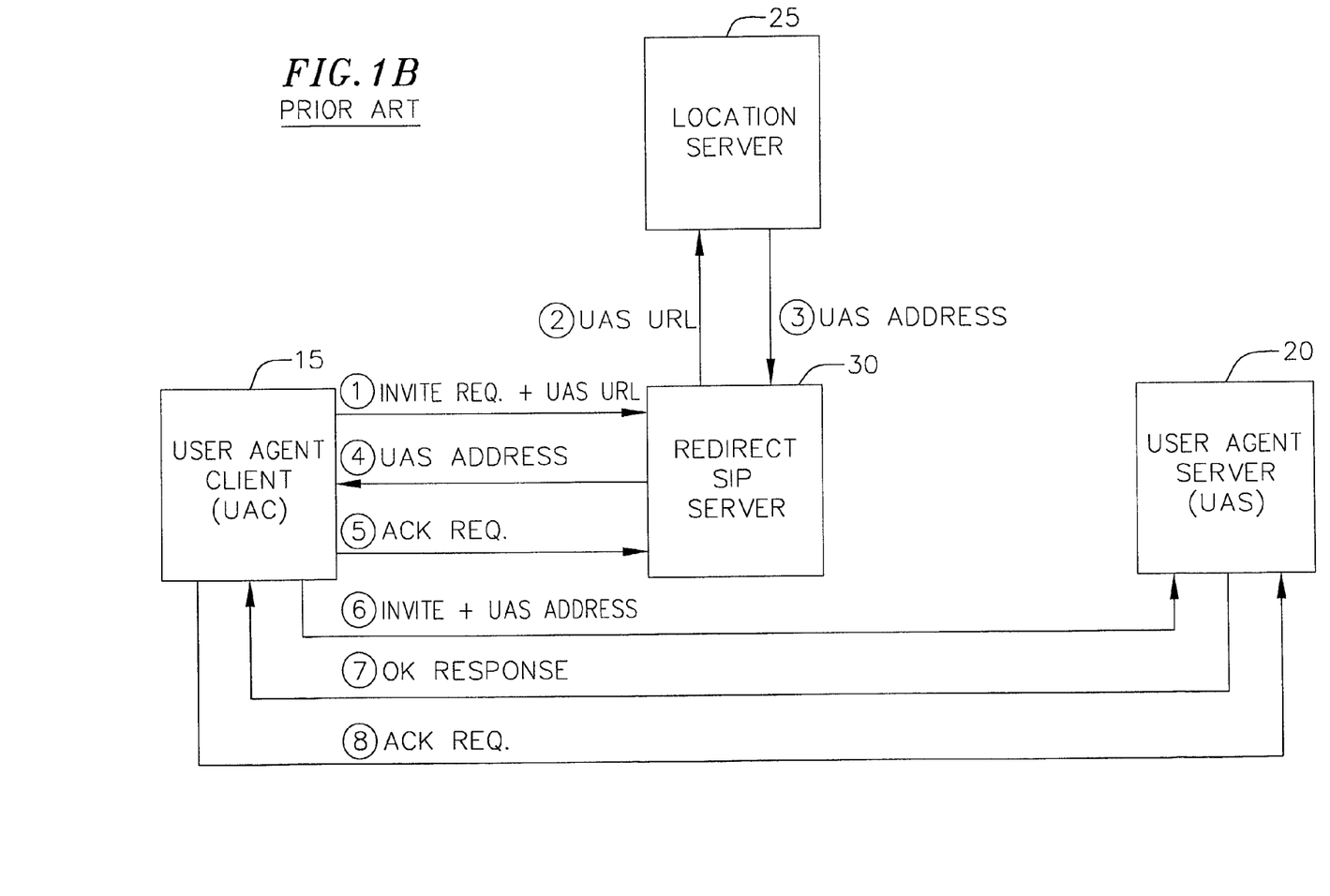
FIG. 1B is a functional block diagram of an alternative method for establishing a SIP call using a redirect SIP server.

FIG. 1B is a functional block diagram of an alternative method for establishing a SIP call using a redirect SIP server 30. The redirect server 30 accepts the INVITE request and contacts the location server 25 with the UAS URL as done by the proxy server 10 of FIG. 1A. The redirect server 30, instead of directly contacting the newly found address, returns the address to the UAC 15. The UAC 15 confirms receipt of the address via an ACK request.

The UAC 15 issues a new INVITE request to the address returned by the redirect server 30. If the call succeeds, the UAS 20 transmits an OK response and the UAC 15 completes the handshake with an ACK request.

While SIP holds much promise for future Internet telephony applications, no clear migration path has yet been identified from legacy-based telephony systems to SIP-based telephony systems. Proposed SIP-based telephony systems target telephones for UAC and UAS functionality. This generally implies that each telephone must include its own SIP stack and associated processing power. Such a requirement, however, will likely result in telephones in the proposed SIP-based telephony systems to be more costly. Furthermore the existing technology does not allow such SIP-based telephony systems to be backward compatible with legacy telephones.

Accordingly, there is a need in the current art for a system and method for enabling legacy telephones to participate seamlessly in SIP-based telephony systems. Such a system and method should allow legacy telephones to seamlessly make and receive SIP calls with other legacy telephones as well as with telephones with SIP functionality without requiring that such legacy telephones be equipped with their own SIP stack.

SUMMARY OF THE INVENTION

The current invention is directed to a switch with an emulation client located in a data communication network that adheres to a SIP signaling protocol. The switch is coupled to a legacy telephone capable of initiating or receiving telephonic communication with a SIP-observant telephone or another legacy telephone over the SIP-observant network. The emulation client translates between PBX and SIP messages to allow the legacy telephone to communicate seamlessly over the SIP-observant network. The switch is further coupled to a location server that includes redirection information for redirecting calls. The calls are preferably redirected based on the location where the user is scheduled to be at the time of the call.

In one aspect of the invention, the system includes a switch for establishing telephonic communication between a first device and a second device over a communication network adhering to the SIP signaling protocol. The switch includes a processing unit with program instructions allowing it to receive a first call establishment message from the first device in a SIP-unobservant format, generate a second call establishment message in a SIP-observant format in response to the first call establishment message, and transmit the second call establishment message to the second device over the communication network.

In another aspect of the invention, the switch receives a first call establishment message from the first device in a SIP-observant format, generates a second call establishment message in a SIP-unobservant format in response to the first call establishment message, and transmits the second call establishment message to the second device over the communication network.

In one particular aspect of the invention, the call establishment message is a request, response, or confirmation.

In another particular aspect of the invention, the SIP-observant format adheres to a private branch exchange signaling protocol.

In another particular aspect of the invention the switch stores redirection information in a location server for redirecting call establishment messages. The switch retrieves redirection information associated with the first call establishment message and redirects the second call establishment message in response to the retrieved redirection information.

In another particular aspect of the invention, the redirection information is associated with a day and a time indicative of when the call establishment messages are to be redirected.

In yet another particular aspect of the invention, the SIP-unobservant format is selected from a plurality of available formats.

BRIEF DESCRIPTION OF THE DRAWINGS

These and other features, aspects and advantages of the present invention will be more fully understood when considered with respect to the following detailed description, appended claims, and accompanying drawings where:

DESCRIPTION OF THE INVENTION

Figure 2:
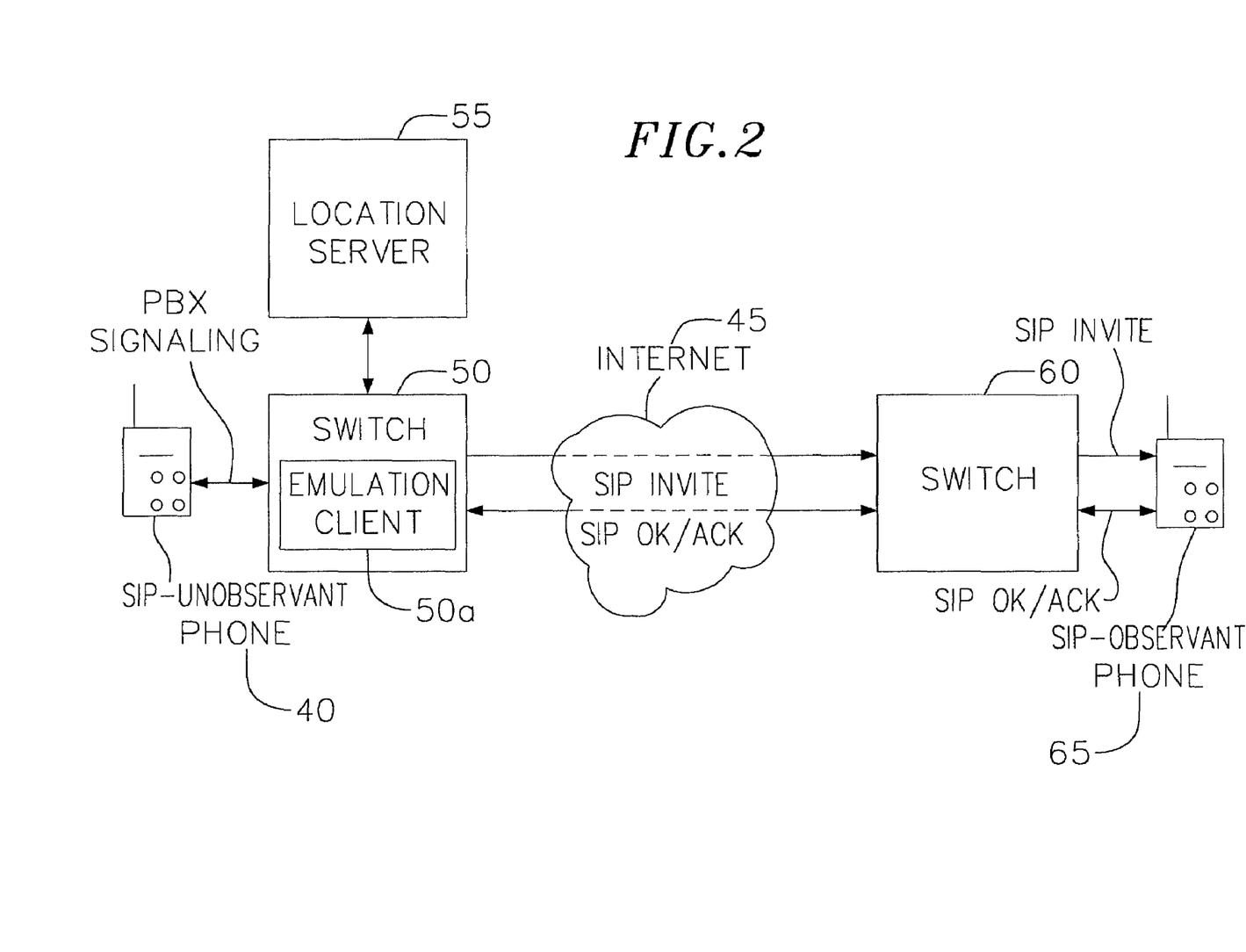
FIG. 2 is a schematic block diagram for a data communication network supporting an emulation service for a SIP-unobservant phone initiating telephonic communication with a SIP-observant phone.

FIG. 2 is a schematic block diagram of a data communication network supporting an emulation service for a SIP-unobservant phone 40 initiating telephonic communication with a SIP-observant phone 65. The SIP-unobservant phone 40 communicates over a SIP-observant network 45 that preferably supports the SIP signaling protocol set forth in RFC 2543. The SIP-observant network 45 is preferably a wide area network such as the Internet.

Switching device 50 is coupled to a location server 55. Switching device 50 is also coupled to switching device 60 over the SIP-observant network 45 via one or more core switches operative on the network. Switching device 60 is in turn coupled to the SIP-observant phone 65. The SIP-observant and unobservant phones 40, 65, switching devices 50, 60, and location server 55, are interconnected via cables or other transmission media known in the art.

The location server 55 preferably contains rules and algorithms for redirecting calls to a location where a user of the SIP-observant phone 65 is scheduled to be. The user's location may vary based on a time and/or day of the call. Alternatively, the location server 55 contains rules and algorithms for redirecting calls made to a call center, to an appropriate extension or agent. The redirection may be based on, for instance, caller information, agent availability, account information, and the like.

Switching device 60 is preferably a switch, router, or other like device known in the art. Switching device 50 is preferably a private branch exchange (PBX) unit managing incoming and outgoing calls for a particular location. Switching device 50 includes an emulation client 50a for converting incoming SIP messages into PBX messages and outgoing PBX messages into SIP messages. In its simplest form, the emulation client 50a takes the role of a UAC 15 in the data communication network. According to one embodiment of the invention, the emulation client 50a is implemented as a software program executing on the internal PBX processor.

The SIP-observant phone 65 preferably includes a SIP stack for transmitting and receiving call establishment messages in a SIP-observant format. The SIP-observant phone preferably takes the role of a UAS 20 as described in detail in RFC 2543. The SIP-unobservant phone 40, however, is a legacy device that does not include a SIP stack. The SIP-unobservant phone 40 transmits and receives call establishment messages in a SIP-unobservant format preferably adhering to a PBX signaling protocol.

In general terms, the SIP-unobservant phone 40 initiates telephonic communication with the SIP-observant phone 65 by transmitting a PBX dial request with a particular telephone number. Switching device 50 receives the dial request and invokes its emulation client 50a to convert the request into a SIP-observant format. In doing so, the emulation client 5a preferably transmits all or a portion of the telephone number to the location server 55 to determine whether the call is to be redirected to a different number or to a particular extension. Preferably, the location server 55 returns the same number or a different number if the call is to be redirected. In an alternative embodiment, the location server 55 returns a list of all potential numbers for redirecting the call, and each number is tried for a connection until a response is received. In yet another embodiment, the location server is only engaged if the initially dialed number does not result in a successful connection.

Switching device 50 preferably creates a SIP INVITE request with the identified telephone number and transmits the request over the SIP-observant network 45. Switching device 60 receives the INVITE request and transmits the request to the SIP-observant phone 65. The SIP-observant phone 65 preferably alerts the callee of the incoming call by emitting, for example, a ringing sound. If the call is answered, switching device 60 indicates a successful connection by returning a SIP OK response to the emulation client 50a. The emulation client 50a translates the OK response to a PBX answer event and transmits it to the SIP-observant phone. In addition, the emulation client 50a confirms the receipt of the OK response by transmitting a SIP ACK message to switching device 60. The SIP-observant and observant phones 40, 65 may then engage in communication until one of the parties terminate the call.

Figure 3:
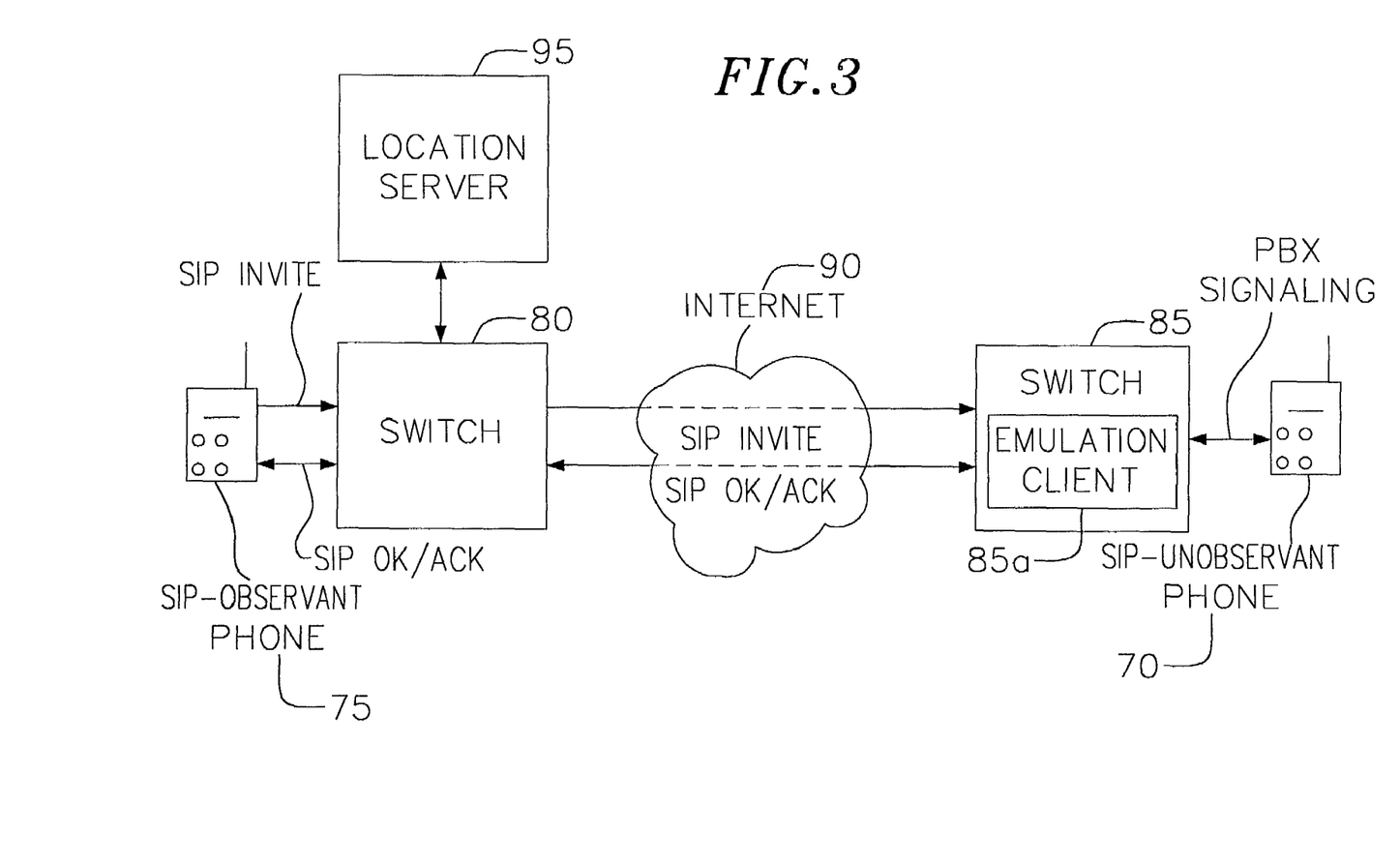
FIG. 3 is a schematic block diagram of a data communication network supporting an emulation service for a SIP-unobservant phone receiving telephonic communication from a SIP-observant phone.

FIG. 3 is a schematic block diagram of a data communication network supporting an emulation service for a SIP-unobservant phone 70 receiving a SIP call from a SIP-observant phone 75. The data communication network of FIG. 3 includes switching devices 80 and 85 coupled respectively to the SIP-observant and unobservant phones 75 and 70. Switching devices 80 and 85 allow the SIP-observant and unobservant phones 75 and 70 to communicate with each other over a SIP-observant network 90.

Switching device 80 is preferably a switch, router, or other like device known in the art. Switching device 80 is coupled to a location server 95 preferably containing rules and algorithms for redirecting calls to a location where a user of the SIP-unobservant phone 70 is scheduled to be. The user's location may vary based on a time and/or day of the call. Alternatively, the location server 55 contains rules and algorithms for redirecting calls made to a call center, to an appropriate extension or agent. The redirection may be based on, for instance, caller information, agent availability, account information, and the like.

Switching device 85 is preferably a PBX unit managing incoming and outgoing calls for a particular location. Switching device 85 includes an emulation client 85a for converting incoming SIP messages into PBX messages and outgoing PBX messages into SIP messages. In its simplest form, the emulation client 85a takes the role of a UAS 20.

In general terms, the SIP-observant phone 75 initiates a telephonic communication with the SIP-unobservant phone 70 by transmitting a SIP INVITE request. The INVITE request preferably includes a SIP URL of switching device 85. The SIP URL preferably takes a form of "sip: user@host," where the user portion indicates a user name or a telephone number associated with the SIP-unobservant phone 70, and the host portion indicates a domain name or network address associated with switching device 85.

Switching device 80 accepts the INVITE request and preferably transmits all or a portion of the SIP URL to the location server 95 to resolve the SIP URL to a more precise address. Preferably, the location server 95 identifies a particular number to where to route the call. Alternatively, the location server 95 returns a list of all potential routing numbers, and each number is tried for a connection until a response is received. In yet another embodiment, the location server is engaged to retrieve redirection information if an initially dialed number does not result in a successful connection.

Switching device 80 preferably creates a new INVITE request with the identified telephone number and transmits the request to switching device 85 over the SIP-observant network 90. Switching device 85 receives the INVITE request and invokes its emulation client 85a to convert the INVITE request to a PBX call request. The SIP-unobservant phone 70 alerts the callee of the in-coming call by, for example, emitting a ringing sound. If the call is answered, the emulation client 85a transmits a SIP OK response to switching device 80 to indicate a successful connection. Switching device 80 confirms receipt of the OK response by transmitting a SIP ACK message. The SIP-observant and unobservant phones 75, 70 may then engage in communication until one of the parties terminate the call.

Figure 4:
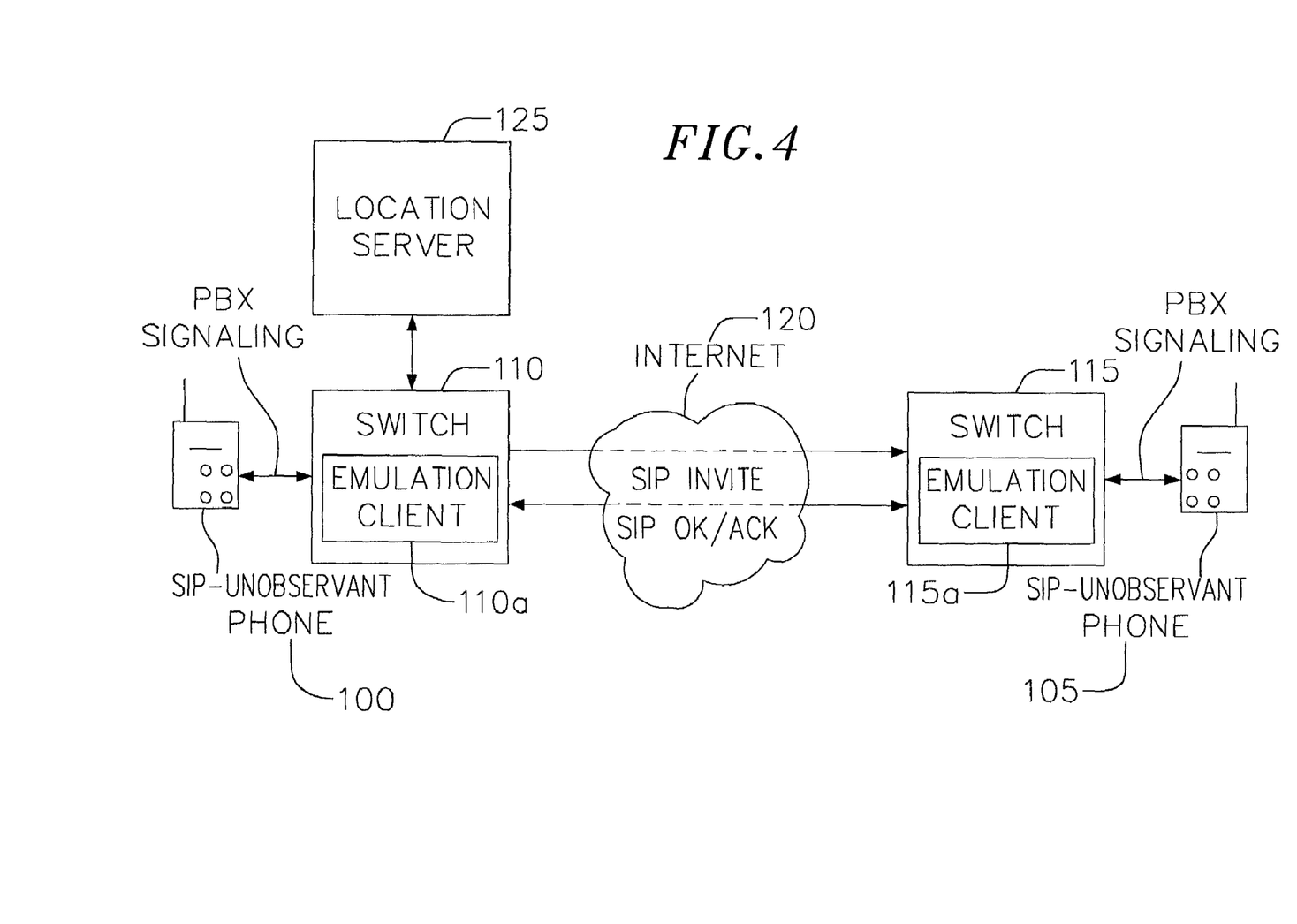
FIG. 4 is a schematic block diagram of a data communication network supporting an emulation service for a SIP-unobservant phone initiating telephonic communication with another SIP-unobservant phone.

FIG. 4 is a schematic block diagram of a data communication network supporting an emulation service for a SIP-unobservant phone 100 initiating a call with another SIP-unobservant phone 105. The data communication network of FIG. 4 includes switching devices 110 and 115 coupled respectively to SIP-unobservant phones 100 and 105. Each switching device 110, 115 is preferably a PBX unit including an emulation client 110a, 115a for translating between SIP and PBX messages. In its simplest form, emulation client 110a takes the role of a UAC 15 and emulation client 115a takes the role of a UAS 20.

Switching device 110 is coupled to a location server 125 preferably containing rules and algorithms for redirecting calls to a location where a user of SIP-unobservant phone 105 is scheduled to be. The user's location may vary based on a time and/or day of the call. Alternatively, the location server 55 contains rules and algorithms for redirecting calls made to a call center, to an appropriate extension or agent. The redirection may be based on, for instance, caller information, agent availability, account information, and the like.

In general terms SIP-unobservant phone 100 initiates telephonic communication with SIP-unobservant phone 105 by transmitting a PBX dial request with the callee's telephone number. Switching device 110 receives the dial request and invokes its emulation client 110a to convert the request into a SIP-observant format. In doing so, the emulation client 110a preferably transmits all or a portion of the telephone number to the location server 125 to determine whether the call is to be redirected to a different number. Preferably, the location server 125 returns the same number or a different number if the call is to be redirected. In an alternative embodiment, the location server 125 returns a list of all potential numbers for redirecting the call, and each number is tried for a connection until a response is received. In yet another embodiment, the location server is only engaged if the initially dialed number does not result in a successful connection.

Switching device 110 preferably creates a SIP INVITE request with the identified number and transmits the request over the SIP-observant network 120. Switching device 115 receives the INVITE request and invokes its emulation client 115a to convert the INVITE request to a PBX call request. The SIP-unobservant phone 105 alerts the callee of the in-coming call by, for example, emitting a ringing sound.

If the call is answered, the emulation client 115a transmits a SIP OK response to emulation client 110a to indicate a successful connection. Emulation client 110 converts the OK response to a PBX answer event and transmits it to SIP-observant phone 100. Emulation client 110a confirms receipt of the OK response by transmitting a SIP ACK message. The SIP-observant phones 110, 115 may then engage in communication until one of the parties terminate the call.

Figure 5:
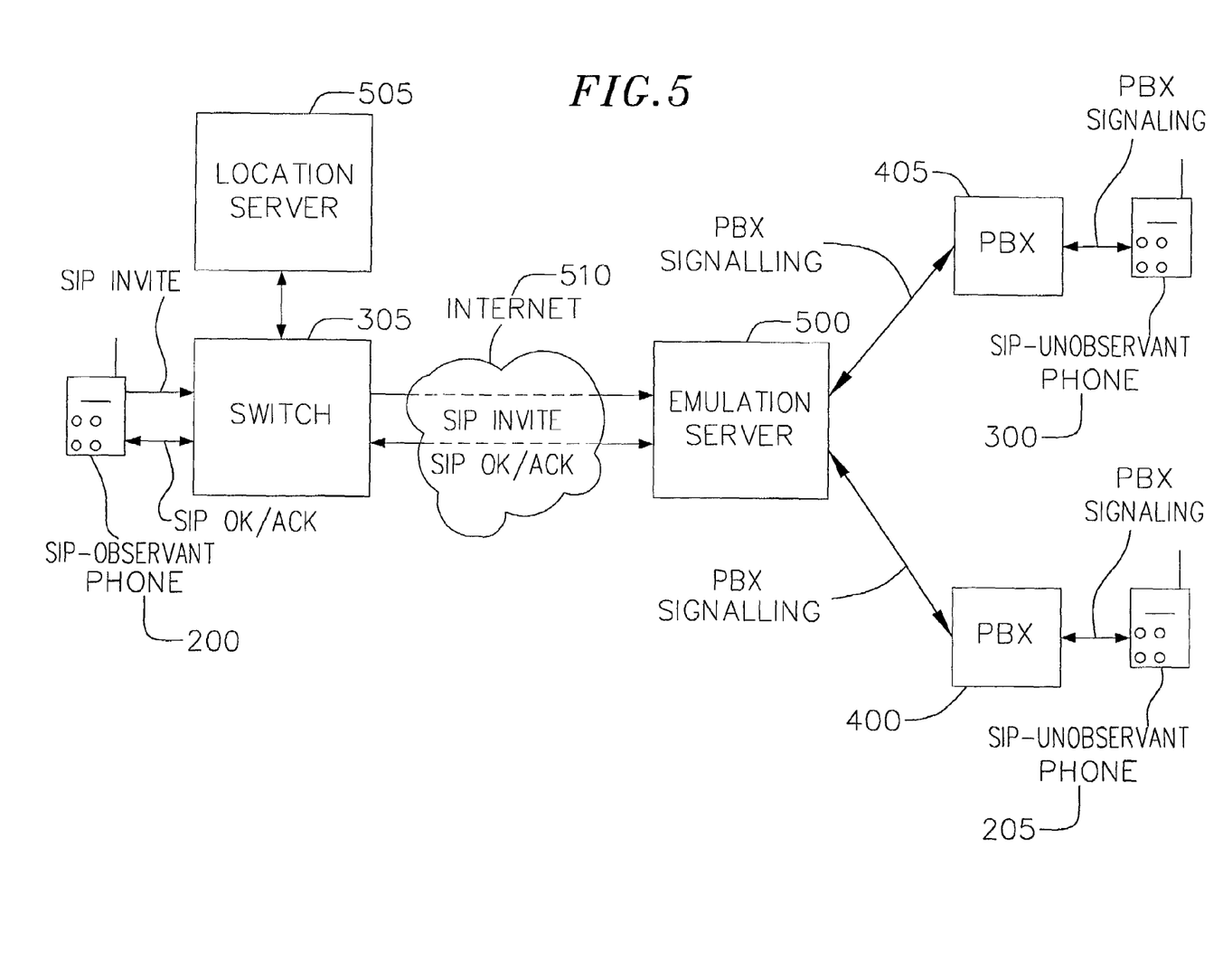
FIG. 5 is a schematic block diagram of a data communication network including a separate emulation server.

FIG. 5 is a schematic block diagram of a data communication network including an independent emulation server 500 that does not reside within a data communication switch. The data communication network includes a switching device 305 coupled to a SIP-observant phone 200. Switching device 305 is also coupled to a location server 505 and a SIP-observant network 510. The location server 505 preferably contains rules and algorithms for redirecting calls to a location where a user of SIP-unobservant phone 205 or 300 is scheduled to be. Alternatively, the location server 55 contains rules and algorithms for redirecting calls made to a call center, to an appropriate extension or agent. The redirection may be based on, for instance, caller information, agent availability, account information, and the like.

The SIP-observant network 305 is a wide area network, such as the Internet, preferably supporting the SIP signaling protocol set forth in RFC 2543.

The data communication network also includes PBX switches 400 and 405 coupled respectively to SIP-unobservant phones 205 and 300. PBX switches 400 and 405 may adhere to the same or different types of PBX signaling protocols. Although the network illustrated in FIG. 5 illustrates only two PBX switches, a person skilled in the art should recognize that the network may support multiple PBX switches and is not limited to only two.

Unlike the data communication networks illustrated in FIGS. 2–4, the data communication network illustrated in FIG. 5 provides translation between SIP and PBX messages via the separate emulation server 500. The emulation server is not limited to translating messages to/from a single PBX unit, but includes logic to translate messages to/from multiple PBX units of different types.

In general terms, the SIP-observant phone 200 initiates telephonic communication with SIP-unobservant phone 205 or 300 by transmitting a SIP INVITE request. The INVITE request preferably includes a SIP URL of the emulation server 500. The switching device 305 accepts the INVITE request and transmits all or a portion of the SIP URL to the location server 505 for resolving the SIP URL to a more precise address. Preferably, the location server 505 identifies a particular number to where to route the call. Alternatively, the location server 505 returns a list of all potential routing numbers, and each number is tried for a connection until a response is received. In yet another embodiment, the location server is engaged for retrieving redirection information if an initially dialed number does not result in a successful connection.

Switching device 305 preferably creates a new INVITE request with the identified telephone number and transmits the request to the emulation server 500 over the SIP-observant network 510. The emulation server 500 receives the INVITE request and identifies the specific type of PBX to which the request should be routed and translated. Preferably, the emulation server maintains a mapping of addresses to PBX types, and uses the mapping information to select the appropriate PBX signaling type. For example, if the INVITE request is addressed to "sip:expert1@commerce.com," the emulation server 500 may determine that the call should be routed to PBX unit 400 and thus, translated to the type of signaling used by PBX unit 400. However, if the INVITE request is addressed to "sip:expert2@commerce.com," the emulation server 500 may determine that the call should be routed to PBX unit 405 and thus, translated to the type of signaling used by PBX unit 405. The routing of the call to the appropriate PBX unit is preferably transparent to the SIP-observant phone 200.

Once the appropriate PBX unit is identified, the emulation server 500 translates the INVITE request to the PBX signaling type used by the identified PBX unit. Thus, if the call is addressed to PBX unit 400, the emulation server translates the INVITE request to the signaling type used by PBX unit 400. SIP-observant phone 205 alerts the callee of the incoming call by, for example, emitting a ringing sound. If the call is answered, PBX unit 400 transmits an answer response to the emulation server 500. The answer response is translated to a SIP OK response and transmitted to switching device 305 to indicate a successful connection. Switching device 305 confirms receipt of the OK response by transmitting a SIP ACK message.

A person skilled in the art should recognize that variations to the data communication network of FIG. 5 may be made without departing from the scope and spirit of the present invention to allow the SIP-unobservant phones 205, 300 to not only receive calls, but to also initiate calls with the SIP-observant phone 200 or another SIP-unobservant phone (not shown) via the separate emulation server 500.

Figure 6:
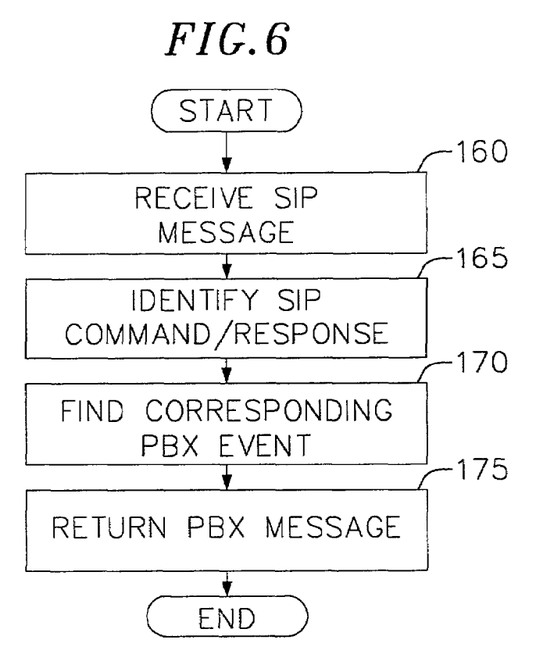
FIG. 6 is a flow diagram of a process for translating SIP messages into PBX messages.

FIG. 6 is a flow diagram of the process taken by the emulation client/server 50a, 85a, 110a, 115a, 500 for translating SIP messages into PBX messages. The emulation client/server receives a call initiation message in a SIP-observant format (160). The call initiation message may be an INVITE request, OK response, and the like. The emulation client/server identifies the SIP request/response to be translated (165) and finds a corresponding PBX event/service via a database lookup, table lookup, or in-line code (170). The PBX event/service is preferably a CSTA, CTI, or other PBX signaling event that does not adhere to the SIP signaling protocol. If multiple PBX units of different types exist to which a call may be routed and translated, the emulation client/server identifies the appropriate PBX unit and translates the SIP request/response to the identified PBX signaling type. The emulation client/server then returns the translated PBX message (175).

Figure 7:
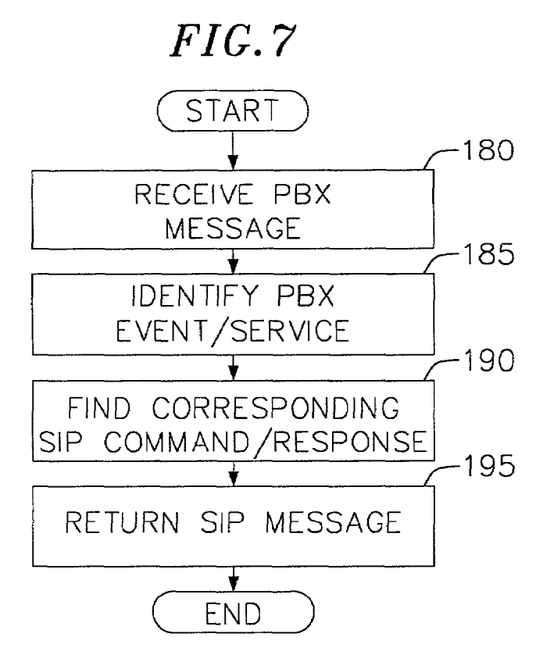
FIG. 7 is a flow diagram of a process for translating PBX messages into SIP messages.

FIG. 7 is a flow diagram of a process taken by the emulation client/server 50a, 85a, 11a, 115a, 500 for translating PBX messages into SIP messages. The emulation client/server receives a call initiation message in a SIP-unobservant format (180). The call initiation message may be a dial request, answer response, call request, or the like, transmitted as a CSTA, CTI, or other PBX signaling event that does not adhere to the SIP signaling protocol. The emulation client/server identifies the PBX event/service to be translated (185) and finds a corresponding SIP request/response via a database lookup, table lookup, or in-line code (190). The emulation client/server then returns the translated SIP message (195).

Figure 8:
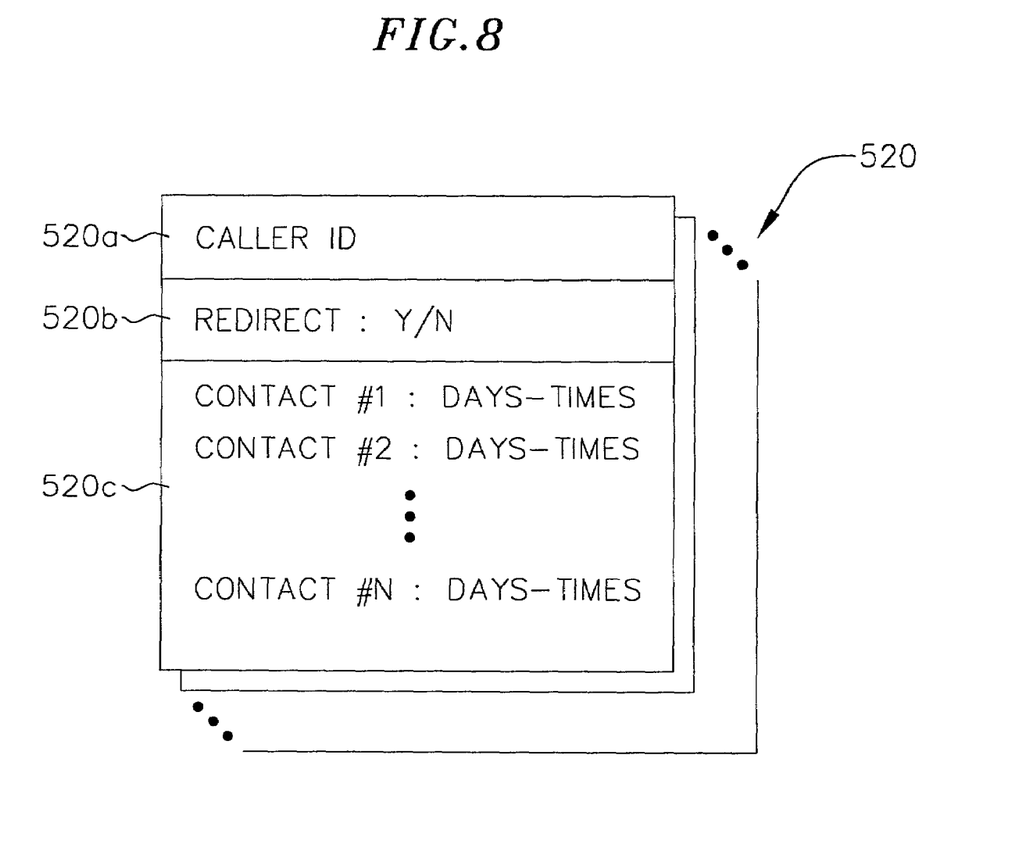
FIG. 8 is a schematic diagram of a location database stored in a location server.

FIG. 8 is a schematic diagram of a location database stored in the location server 55 of FIG. 2, which is representative of location servers 95, 125, and 505. The location database includes a plurality of location records 520, with each record preferably being headed and identified by a unique caller identifier (ID) 520a. The caller ID preferably includes all or a portion of the callee's contact information provided by the switching device 50. The contact information is preferably an express telephone number if a SIP-unobservant phone initiates the call, or a SIP URL if a SIP-observant phone initiates the call. Alternatively, the contact information may be the caller's name or the caller's customer number.

Each location record 520 may further indicate whether the call is to be redirected 520b to a particular number or agent, or whether the call is to be transmitted to the originally indicated number.

A contact field 520c includes one or more contact numbers to which a call may be redirected. In the illustrated embodiment, each contact number is preferably associated with a day and a range of times indicating when a call should be rerouted to the indicated number. In an alternative embodiment, the contact field indicates a particular extension or available agent information for routing a call placed to a call center. A person skilled in the art should recognize, furthermore, that the location record may include other information for determining arid when and how to redirect a call.

Figure 9:
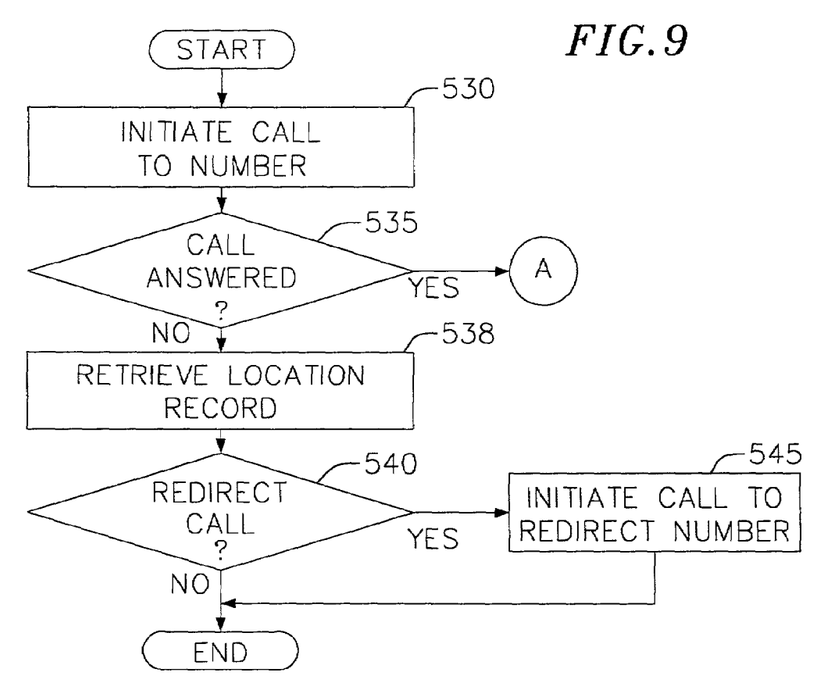
FIG. 9 is a flow diagram of a process for utilizing the location database of FIG. 8 to redirect calls according to one embodiment of the invention.

FIG. 9 is a flow diagram of a process for utilizing the location database of FIG. 8 to redirect calls according to one embodiment of the invention. According to the illustrated embodiment, a call may be redirected if an initially dialed number does not result in a successful connection.

The process starts, and either a SIP-observant or SIP-unobservant phone initiates a call to a particular number (530). A determination is made if the call has been answered (535) preferably based on the receipt of a SIP OK response. If the call has not been answered, the location server is engaged to retrieve an appropriate location record 520 based on either the called number or the calling party's information (538). A determination is then made as to whether the call is to be redirected (540). The location server may examine the redirect field 520c of the location record 520 to make this determination. If the call is to be redirected, the appropriate redirect information is retrieved from the contact field 520*d*, and a call is initiated to the redirect number (545).

Figure 10:
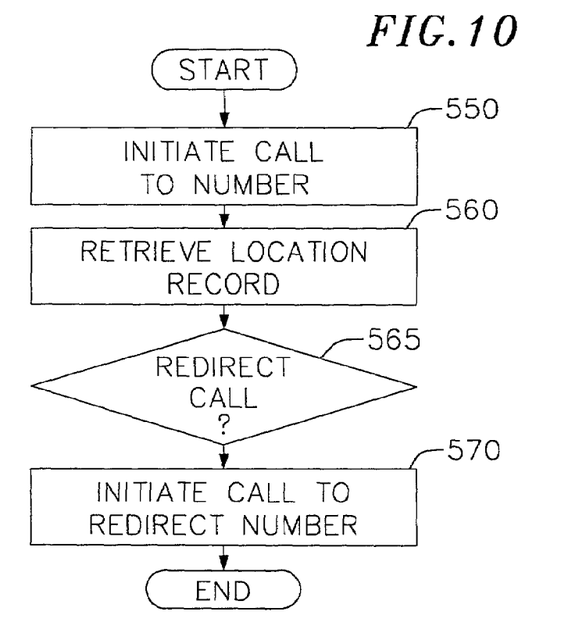
FIG. 10 is a flow diagram of a process for utilizing the location database of FIG. 8 to redirect calls according to an alternative embodiment of the invention.

FIG. 10 is a flow diagram of a process for utilizing the location database of FIG. 8 to redirect calls according to an alternative embodiment of the invention. According to this alternative embodiment, the location database is engaged prior to initiating the call.

The process starts and either a SIP-observant or SIP-unobservant phone initiates a call to a particular number (530). However, instead of trying the number first for a response, the location server is invoked to retrieve the appropriate location record (560). A determination is then made as to whether to redirect the call to a more precise address, a particular extension number, or an alternate telephone number where the callee is scheduled to be (565). The location server may examine the redirect field 520*c* of the location record 520 to make this determination. If the call is to be redirected, the appropriate redirect information is retrieved from the contact field 520*d*, and a call is initiated to the redirect number (570).

Although this invention has been described in certain specific embodiments, those skilled in the art will have no difficulty devising variations which in no way depart from the scope and spirit of the present invention. For example, although the present invention is described with respect to SIP-observant and unobservant telephones, a person skilled in the art should recognize that such telephones may be replaced with any device capable of telephonic communication over the Internet, such as, for example, a wireless phone or computer.

A person skilled in the art should also recognize that the SIP-unobservant phones may utilize any non-SIP signaling methods besides PBX to communicate with the SIP-observant phones. The emulation client/server may further be modified without departing from the scope and spirit of the present invention to allow a telephone utilizing any such non-SIP signaling method to communicate via the SIP-observant network.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A communication network adhering to a session initiation protocol (SIP) for establishing telephonic communication between devices, the network comprising:
   a SIP-unobservant device;
   a SIP-observant device;
   a switching device connected to said SIP-unobservant device, said switching device including an emulation client operative between the SIP-unobservant device and the SIP-observant device, said emulation client characterized in that a call establishment message transmitted by the SIP-unobservant device in a SIP-unobservant format is converted to a SIP-observant format by the emulation client and transmitted to the SIP-observant device; and
   a location server connected to said switching device, said location server including redirection information for redirecting calls, wherein said location server including a location database for storing the redirection information, the communication network further characterized in that the emulation client retrieves from the location database redirection information containing rules and algorithms associated with the call establishment message and redirects the call establishment message based on the retrieved redirection information.

2. The communication network of claim 1, wherein said switching device is a private branch exchange unit.

3. The communication network of claim 1, wherein said emulation client further for converting a call establishment message transmitted from said SIP-observant device in a SIP-observant format to a SIP-unobservant format and transmitted to the SIP-unobservant device.

4. The communication network of claim 3, wherein the redirection information is associated with a day and time indicative of when the call establishment message is to be redirected.

5. The communication network of claim 1 further characterized in that the emulation client selects the SIP-unobservant format from a plurality of available formats.

6. A communication network for establishing telephonic communications between devices, the network comprising:
   a SIP-unobservant device;
   a SIP-observant device;
   a switching device connected to said SIP-unobservant device, said switching device including an emulation client operative between the SIP-unobservant device and the SIP-observant device, said emulation client characterized in that a call establishment message transmitted by the SIP-observant device in a SIP-observant format is converted to a SIP-unobservant format by the emulation client and transmitted to the SIP-unobservant device; and
   a location server connected to said switching device, said location server including redirection information for redirecting calls, wherein said location server including a redirection database for storing the redirection information, the communication network further characterized in that the emulation client retrieves from the location database redirection information containing rules and algorithms associated with the call establishment message and redirects the call establishment message based on the retrieved redirection information.

7. The communication network of claim 6, wherein said switching device is a private branch exchange unit.

8. The communication network of claim 6, wherein said emulation client further for converting a call establishment message transmitted from said SIP-observant device in a SIP-observant format to a SIP-unobservant format and transmitted to the SIP-unobservant device.

9. The communications network of claim 8, wherein the redirection information is associated with a day and time indicative of when the call establishment message is to be redirected.

10. The communication network of claim 6 further characterized in that the emulation client selects the SIP-unobservant format from a plurality of available formats.

* * * * *